Jan. 19, 1971 P. J. TUCKER 3,556,670
ROTARY HEAT ENGINE
Filed May 27, 1969 2 Sheets-Sheet 1
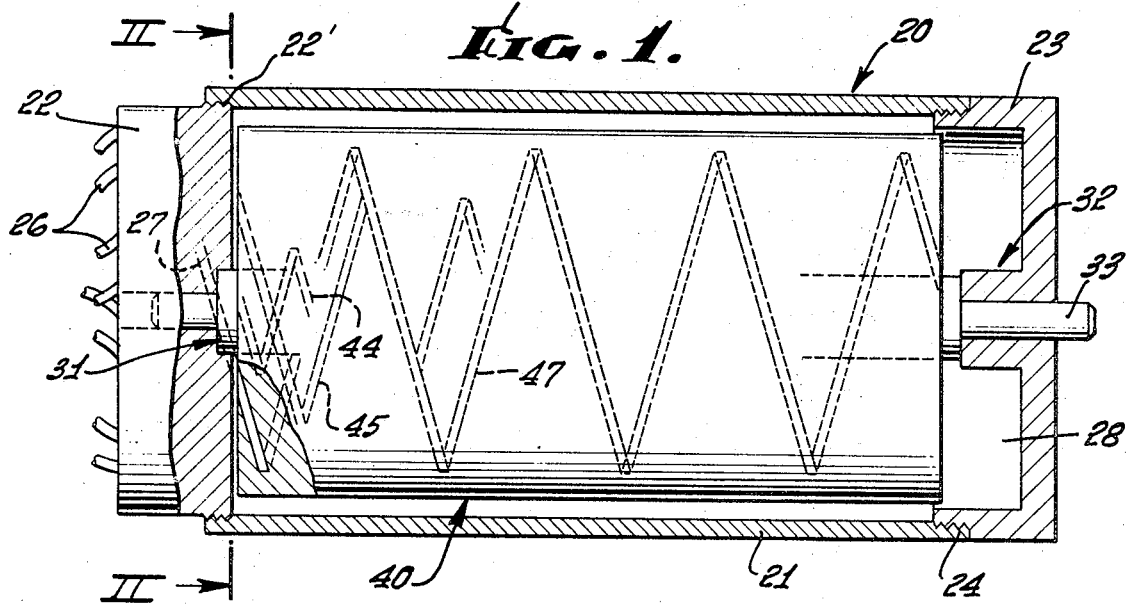
FIG. 1.
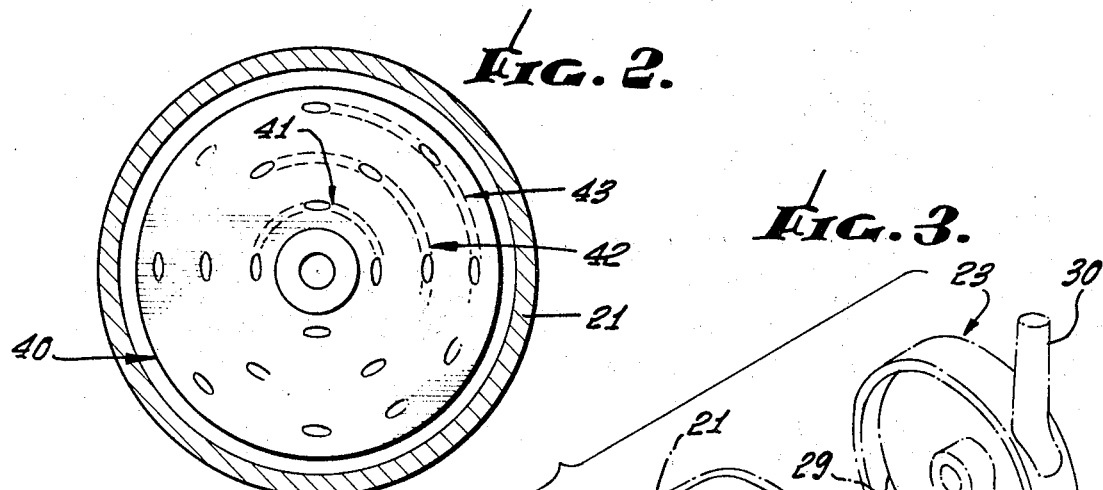
FIG. 2.
FIG. 3.
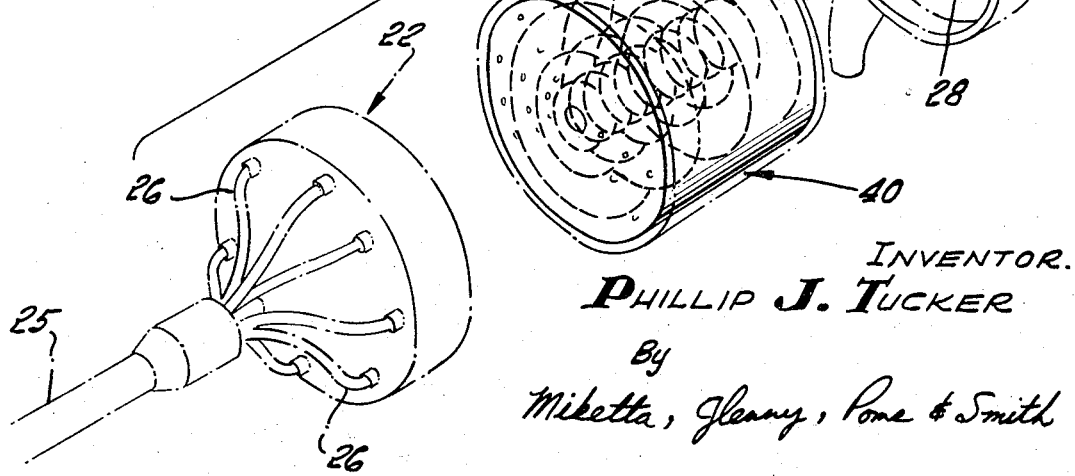
INVENTOR.
PHILLIP J. TUCKER
By
Miketta, Glenny, Poms & Smith
ATTORNEYS.

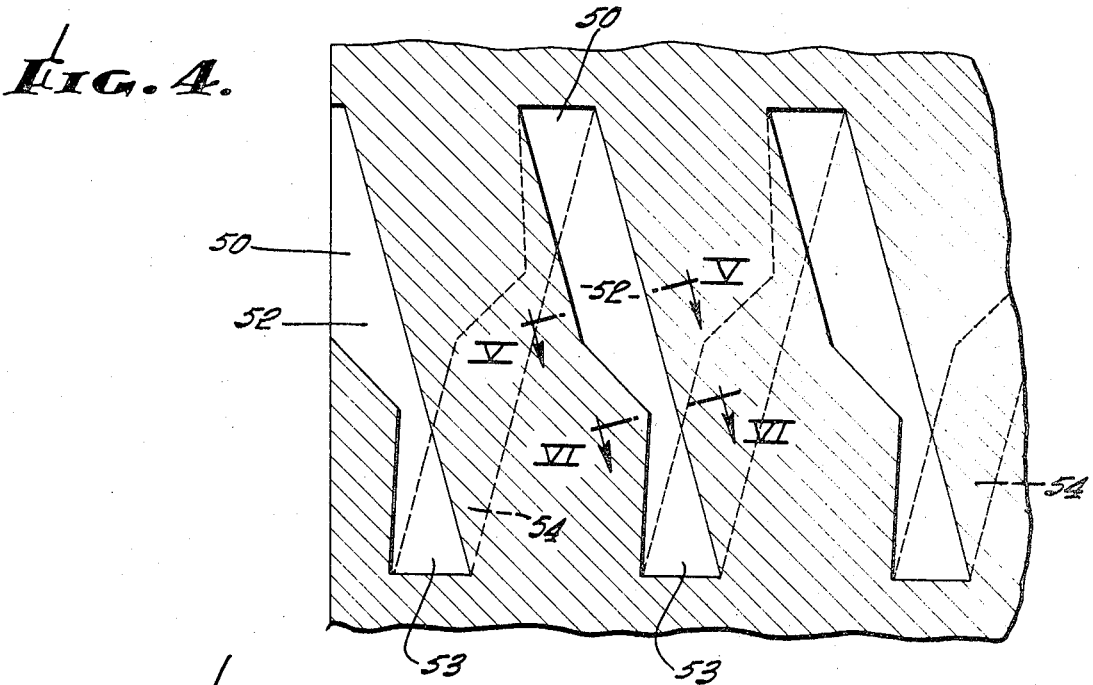
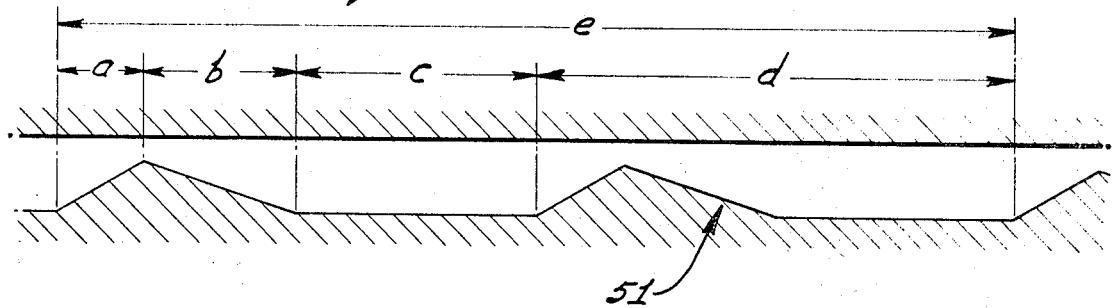
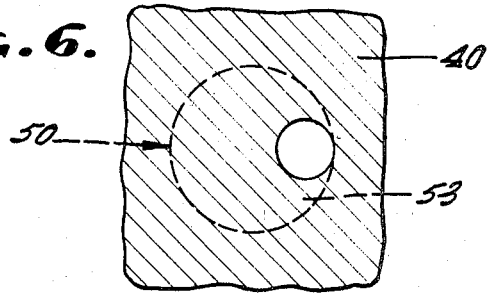
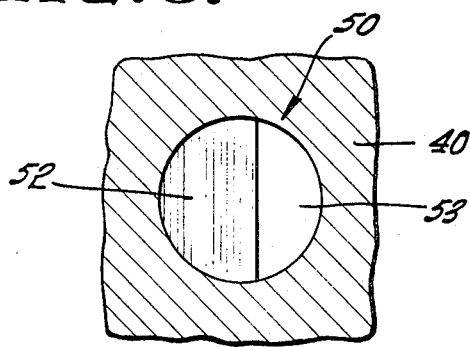
INVENTOR.
PHILLIP J. TUCKER
By
Miketta, Glenny, Poms & Smith
ATTORNEYS.

United States Patent Office 3,556,670
Patented Jan. 19, 1971

3,556,670
ROTARY HEAT ENGINE
Phillip J. Tucker, 5708 S. Condon Ave.,
Los Angeles, Calif. 90056
Filed May 27, 1969, Ser. No. 828,230
Int. Cl. F01d 5/00, 5/08, 1/02
U.S. Cl. 415—75           10 Claims

ABSTRACT OF THE DISCLOSURE

A rotary heat engine for efficiently converting gas thermal energy to mechanical energy comprising a hollow generally cylindrical housing, a head secured at each end, one of the heads having gas intake means and the other of the heads having gas exhaust means, bearings mounted in the heads supporting a shaft on which is mounted a rotor. The rotor has a plurality of internal spirally disposed fluid or gas chambers each of which has the same hand and pitch and each of which defines a succession of converging, diverging and constant area sections so that fluid introduced under pressure to the chambers releases its heat energy which is converted to mechanical rotational shaft power.

BACKGROUND OF THE INVENTION

This invention broadly relates to heat engines in general, i.e., an apparatus for converting thermal energy to mechanical energy. Specifically, the invention relates to an engine which provides mechanical work when supplied with a gas of elevated pressure-temperature at a highly efficient rate. The Carnot efficiency of the present invention is believed to exceed the efficiency of any other heat engine devised and clearly exceeds the efficiency attained by conventional internal combustion or stream engines.

There are, of course, numerous heat engines in the prior art and a number of these such as those disclosed in Pat. Nos. 511,964, 710,261, 712,119, 744,542, 756,606, 1,053,627, 1,869,102, and 2,036,018, show a cylindrical housing having a head at each end, one of which includes gas intake means and the other including gas exhaust means, and a rotor mounted on a shaft rotatably carried in bearings mounted in the housing head members. Each of these engines have gas paths defined by elements supported on the external surface of the rotor together with the housing inner wall or a sleeve or the like. Several of such engines employ an external rotor surface spiral gas path with various restrictions projecting into such paths to control the flow of gas therethrough. The general difficulty with such prior art engines is that they apparently failed to provide the efficiency attainable by conventional fluid turbines and internal combustion engines.

In light of the above discussion of the prior art and background of this invention, it is a general object of the present invention to provide a heat engine having a Carnot efficiency which exceeds the efficiencies obtainable by other head engines presently known and which can be practicably obtained.

It is the object of this invention to provide a heat engine having a generally cylindrical hollow housing open at each end, the ends being closed by heads, one of which includes gas intake means and the other of which includes gas exhaust means and a rotor mounted on a shaft carried by the heads and having novel and unusual gas flow paths through the internal portions of the rotor for efficiently converting the thermal energy to mechanical energy.

SUMMARY OF THE INVENTION

Generally stated, the present invention comprises a rotary engine for efficiently converting the thermal energy of a gas to mechanical energy in the form of shaft power and including a housing having a main hollow housing portion and end heads secured thereon, one of the heads having gas intake means and the other of the heads having gas exhaust means, and a rotor of generally cylindrical configuration mounted on a shaft carried by bearings mounted in the end heads, the rotor having a plurality of internal spirally disposed fluid chambers, each of the chambers having the same pitch and hand, each of the chambers defining a plurality of successive nozzle and rest sections, the nozzle sections having variable area while the rest sections are of constant area so as to maximize the conversion of thermal energy to mechanical energy as the elevated pressure-temperature gas passes through the rotor chambers and is exhausted.

BRIEF DESCRIPTION OF THE DRAWINGS

FIG. 1 is a side elevation view of an exemplary embodiment of a rotary heat engine constructed in accordance with the present invention, and showing portions thereof in section;

FIG. 2 is a sectional view taken along the plane II—II of FIG. 1;

FIG. 3 is an exploded diagrammatic view of the exemplary embodiment of the rotary heat engine shown in FIG. 1;

FIG. 4 is a sectional view taken along a semi-cylindrical plane passing through one of the internal spiral fluid chambers of the rotor so as to illustrate the variable area of such fluid chamber;

FIG. 5 is a sectional view taken along the plane V—V of FIG. 4;

FIG. 6 is another sectional view taken along the plane VI—VI of FIG. 4; and

FIG. 7 is a diagrammatic view of the fluid chamber illustrated in FIG. 4 shown developed, for purposes of explanation.

BRIEF DESCRIPTION OF THE PREFERRED EMBODIMENT

Referring now to FIGS. 1 through 3, there is shown an exemplary embodiment of a rotary heat engine constructed in accordance with the present invention and comprising a housing, indicated generally at 20 and a generally cylindrical rotor indicated at 40.

The housing 20 includes a main cylindrical housing portion 21 which may be suitably secured to a stationary platform, to a vehicle, or the like. Cylinder 21 is provided with an intake head 22 secured at one end of the hollow housing such as by threads 22′ formed on the external surface of the head and the internal surface of the housing. The housing also includes an exhaust head 23 similarly secured to housing 21 through threads 24.

The intake head 22 of the housing includes fluid intake means which in the exemplary embodiment comprises a manifold to which a high pressure-temperature fluid is supplied through a main inlet pipe 25 through a plurality of individual feed pipes all of which are indicated at 26. Each of the feed pipes are secured to the external end portion of the head 22 so as to provide a plurality of circumferentially spaced inlets located about a circle. The head 22 has a plurality of inlet ports in fluid communication with the individual feed pipes 26. One of such inlet ports is partially shown in dotted lines at 27 in FIG. 1 and it will be seen that such inlet port is angularly disposed with respect to the inner end surface thereof. It will therefore be appreciated that the high pressure-temperature fluid is introduced into the housing 21 at a plurality of locations each of which at the outlet thereof is in registry with an inlet of a fluid chamber in the rotor as will become more clear from the following description.

Exhaust head 23 includes an exhaust chamber 28 of generally annular configuration. Exhaust ports are provided in the cylindrical wall of the head 23 one of which is shown at 29. Each of the exhaust ports are connected to an exhaust pipe both of which are indicated at 30.

In the exemplary embodiment, each of the heads 22, 23 support bearing means for rotatably mounting a shaft. Such bearing means is indicated at 31, 32 and the shaft is indicated at 33. It will be seen that the rearward end of shaft 33 projects outwardly of exhaust head 23 so as to comprise the output shaft of the rotary engine.

Rotor 40, in the exemplary embodiment, is fixedly mounted on shaft 33 for rotation within housing 21. As will be explained hereinafter, the rotor 40 may comprise a plurality of axial sections which are suitably secured to one another so as to simplify and make practicable the manufacture of such rotor. The rotor 40 has a plurality of internal spirally disposed fluid chambers each of which has the same hand and pitch. In the exemplary embodiment, the fluid chambers are arranged in three concentric rings, although it will be understood, that a lesser or larger number of rings may be employed. The three concentric rings are generally indicated at 41, 42 and 43. In ring 41, there may be four circumferentially equally spaced fluid chambers each of which extend throughout the axial length of the rotor. In ring 42, there are provided two additional fluid chambers so as to comprise six chambers in total. In the outermost ring 43, there are provided two additional rings so as to total eight. With this particular configuration of three concentric rings which comprise four, six and eight fluid chambers, respectively, the inlet ports in the inlet head 23 may include two, three and four inlet openings disposed on concentric rings of the same diameter as the rings in the rotor and equally circumferentially spaced apart.

As seen in FIG. 1, each of the fluid chambers in the concentric circles have a pitch angle of substantially 15° and are right-handed as viewed from the intake end of the engine and extend throughout the axial length of the rotor. In this figure, one ring 44 is shown in dotted lines so as to indicate the path of the ring in the first concentric circle 41. A second chamber 45 is also shown in dotted lines representing one of the six chambers in the second concentric ring 42. Finally, a third fluid chamber 47 is shown in dotted lines, and illustrated as extending across the entire length of the rotor so as to represent one of the eight chambers in the outermost concentric ring 43. A similar representation wherein each of the chambers is indicated by a single dashed line appears in FIG. 3. It will be noted that the head 22 intake parts are also disposed at an angle of 15° with respect to the inner head surface so as to be in axial alignment with the fluid chamber in periodic registry therewith.

One of the most important features of the present invention is the internal construction of each of the fluid chambers in rotor 40. In FIGS. 4 through 6, one of such chambers is illustrated at 50. The same chamber is illustrated in developed form in FIG. 7 to aid in the explanation of the configuration of the fluid chambers. Chamber 50 includes a plurality of successive converging, diverging and constant area sections which comprise a chamber segment indicated generally at 51. An entire segment is represented as having a length $d$ in FIG 7. Segment 51 includes a converging section 52, followed by a diverging section 53 and a constant area or rest section 54. As seen in FIG. 7, the converging section has a length $a$ which is approximately equal to one half the length $b$ of the diverging section 53 and this variable area section 52, 53 has a combined length substantially equal to the length $c$ of the rest or constant area section 54.

It will be seen that the high temperature-pressure fluid in passing through the spiral fluid chambers will pass through alternate variable and constant area sections wherein the fluid will be compressed, expanded and permitted to flow under constant pressure conditions. The fluid chambers are started at the forward end surface of the rotor so that, in the first concentric ring 41, two diametrically opposed chambers commence in the converging section of the segment and the other two chambers are started at that point along the axial length of the chamber which represents the chamber when the rotor is rotated through 90°. In the second and third concentric rings, pairs of diametrically opposed chambers are similarly started at the same point in the chamber segment and adjacent pairs are started at a position representing the chamber when the rotor is advanced through an arc equal to 360° divided by the number of chambers in that ring.

In operation, as the high temperature-pressure fluid passes through the plurality of fluid chambers, the heat energy of the fluid is converted into mechanical shaft energy. It will be appreciated that the heat engine of the present invention will not produce any irritable, harmful, or otherwise obnoxious exhaust gas emission products and will operate with extreme quietness. The engine is also extremely simple requiring only several bearings and unlike turbines, does not require close-tolerance manufacturing or difficult machining operations.

As indicated previously, the rotor of the exemplary embodiment of the heat engine may be constructed of a plurality of connected axial segments each of which would be individually machined so as to permit the variable area chamber to be milled in the rotor segment. The plurality of variable area fluid chambers are then assembled to form a rotor which could not be easily formed by other techniques.

In the preferred embodiment described and shown, the engine is designed to be operated by recompressible gases; the engine apparently utilizes properties of such gases which have not heretofore been fully appreciated.

Other modifications and variations of the present invention are possible in light of the above teaching. It is therefore to be understood that within the scope of the appended claims, the invention may be practiced otherwise than as specifically described.

I claim:

1. A rotary heat engine for efficiently converting the thermal energy of a gas to mechanical energy comprising:
   a housing including a main hollow housing and end heads secured thereon, each of said heads having bearing means for rotatably mounting a shaft, one of said heads having fluid intake means and the other of said heads having fluid exhaust means; and
   a generally cylindrical rotor mounted on a rotatable shaft carried by said bearing means, said rotor having a plurality of internal spirally disposed fluid chambers, each of said chambers having the same hand and pitch, each of said chambers defining a plurality of successive converging, diverging and constant area sections, whereby fluid under pressure admitted to said chambers through said intake means releases the energy therein so as to rotate the rotor.

2. The engine of claim 1 wherein each of said chamber converging sections is approximately one-half the length of each said diverging sections.

3. The engine of claim 2 wherein each of said chamber constant area sections is substantially the same length as each of said diverging sections.

4. The engine of claim 3 wherein the inlet area of each of said converging sections, the exit area of each of said diverging sections, and said constant area sections are substantially equal.

5. The engine of claim 1 wherein said spiral chambers are arranged in concentric circles, an even number of chambers in the innermost circle, and an additional two chambers in each radially outwardly disposed circle.

6. In a rotary engine comprising a generally cylindrical main housing and heads mounted on each end carrying journal bearings for rotatably supporting a shaft, one of said heads having fluid inlet means and the other of said heads having fluid exhaust means, the provision of:

a cylindrical rotor mounted on said shaft and having a plurality of helically disposed fluid chambers therein, each of said chambers having substantially the same pitch, said pitch being approximately 15°, each of said chambers being equally circumferentially spaced about at least one concentric circle, each of said chambers having a plurality of successive nozzle and rest sections, said nozzle sections having a variable area and said rest sections being of constant area.

7. The provision of claim 6 wherein said even number of additional chambers are disposed in each succeeding radially outwardly disposed circle.

8. The provision of claim 6 wherein each of said chambers have a generally circular cross-section.

9. The provision of claim 6 wherein said nozzle and rest sections are of substantially equal length.

10. The provision of claim 9 wherein said nozzle section comprises converging and diverging portions.

References Cited

UNITED STATES PATENTS

| 767,689 | 8/1904 | Hedlund | 230—120 |
| 1,035,543 | 8/1912 | Dake | 230—120 |
| 1,902,439 | 12/1930 | Foss | 415—75 |
| 2,289,900 | 7/1942 | Braga | 415—75 |

FOREIGN PATENTS

| 473,457 | 9/1914 | France | 415—76 |
| 598,080 | 9/1959 | Italy | 415—202 |

HENRY F. RADUAZO, Primary Examiner

U.S. Cl. X.R.

415—185; 416—176